US012218898B2

(12) United States Patent
Kim et al.

(10) Patent No.: US 12,218,898 B2
(45) Date of Patent: Feb. 4, 2025

(54) METHOD, COMPUTER DEVICE, AND NON-TRANSITORY COMPUTER-READABLE RECORD MEDIUM TO DISPLAY MESSAGE THREAD ON CHATROOM COVER SCREEN

(71) Applicant: LINE Plus Corporation, Seongnam-si (KR)

(72) Inventors: Sungwhan Kim, Seongnam-si (KR); Hajung Aum, Seongnam-si (KR); Seo Hyun Cho, Seongnam-si (KR)

(73) Assignee: LINE Plus Corporation, Gyeonggi-do (KR)

( * ) Notice: Subject to any disclaimer, the term of this patent is extended or adjusted under 35 U.S.C. 154(b) by 0 days.

(21) Appl. No.: 17/735,642

(22) Filed: May 3, 2022

(65) Prior Publication Data
US 2022/0360552 A1    Nov. 10, 2022

(30) Foreign Application Priority Data

May 4, 2021   (KR) ......................... 10-2021-0057676

(51) Int. Cl.
*H04L 51/216* (2022.01)
*H04L 51/04* (2022.01)

(52) U.S. Cl.
CPC ............ *H04L 51/216* (2022.05); *H04L 51/04* (2013.01)

(58) Field of Classification Search
CPC ............................. H04L 51/216; H04L 51/04
See application file for complete search history.

(56) References Cited

U.S. PATENT DOCUMENTS

| 8,443,041 | B1 * | 5/2013 | Krantz | H04L 51/04 |
| | | | | 709/224 |
| 8,620,363 | B1 * | 12/2013 | Vargantwar | H04W 4/12 |
| | | | | 709/227 |
| 10,135,781 | B1 * | 11/2018 | Yeskel | H04L 67/306 |
| 11,099,726 | B1 * | 8/2021 | Montazeri | H04L 12/1827 |
| 2013/0041964 | A1 * | 2/2013 | Lin | H04W 4/12 |
| | | | | 709/206 |
| 2016/0364368 | A1 * | 12/2016 | Chen | H04L 51/216 |
| 2017/0329779 | A1 * | 11/2017 | Lewin-Eytan | H04L 51/42 |
| 2018/0083904 | A1 * | 3/2018 | Jayaram | H04L 51/42 |

(Continued)

FOREIGN PATENT DOCUMENTS

| EP | 1209849 A2 * | 5/2002 | ......... H04L 12/1818 |
| KR | 10-2002-0074304 A | 9/2002 | |

(Continued)

OTHER PUBLICATIONS

Korean Office Action dated Dec. 1, 2022 issued in Korean Patent Application No. 10-2021-0057676.

*Primary Examiner* — Jennifer N Welch
*Assistant Examiner* — Reji Kartholy
(74) *Attorney, Agent, or Firm* — Harness, Dickey & Pierce, P.L.C.

(57) ABSTRACT

Methods, computer devices, and non-transitory computer-readable record media for displaying a message thread on a chatroom cover screen may be provided. A chatroom cover display method may include receiving a message thread including messages exchanged through a chatroom in response to an access request for the chatroom, and displaying a cover screen of the chatroom in response to the access request and displaying the message thread on the cover screen.

19 Claims, 10 Drawing Sheets

(56) References Cited

U.S. PATENT DOCUMENTS

| | | | |
|---|---|---|---|
| 2018/0174265 A1* | 6/2018 | Liu | G06Q 30/0645 |
| 2018/0183619 A1* | 6/2018 | Jayaram | H04L 63/10 |
| 2018/0331996 A1* | 11/2018 | Zhang | H04L 51/216 |

FOREIGN PATENT DOCUMENTS

| | | |
|---|---|---|
| KR | 10-2015-0084284 A | 7/2015 |
| KR | 10-1654261 B1 | 9/2016 |
| KR | 10-2018-0039547 A | 4/2018 |
| KR | 10-2018-0068400 A | 6/2018 |
| KR | 10-0858012 B1 | 9/2018 |

* cited by examiner

METHOD, COMPUTER DEVICE, AND NON-TRANSITORY COMPUTER-READABLE RECORD MEDIUM TO DISPLAY MESSAGE THREAD ON CHATROOM COVER SCREEN

CROSS-REFERENCE TO RELATED APPLICATION(S)

This U.S. non-provisional application claims the benefit of priority under 35 U.S.C. § 119 to Korean Patent Application No. 10-2021-0057676, filed May 4, 2021, the entire contents of which are incorporated herein by reference in their entirety.

BACKGROUND

Technical Field

Some example embodiments relate to technology for providing a chatroom cover screen.

Related Art

An instant messenger that is a general communication tool refers to software that allows a user to send and receive a message or data in real time. The user may register a contact on a messenger and may send and receive messages with a counterpart on a contact list in real time.

Due to such a messenger function, the messenger is commonly used in a mobile environment of a mobile communication terminal as well as a personal computer (PC).

For example, a mobile messenger service system and method of a portable terminal can provide a messenger service between mobile messengers installed on mobile terminals using a wireless communication network.

As the use of an instant messenger becomes more popular and functions provided through the instant messenger become more diversified, an openchat function that enables a chat using a link without sharing personal information, such as a telephone number and an ID, is being serviced.

SUMMARY

Some example embodiments may display a message thread on a cover screen such that a user may easily grasp information, context, atmosphere, and the like in a chatroom before joining the chatroom.

Some example embodiments may display a message thread with a high up-to-dateness or a message thread with high information (e.g., a message thread including messages meeting a predetermined (or alternatively, desired) condition) on a chatroom cover screen.

According to an aspect of at least one example embodiment, there is provided a chatroom cover display method performed by a computer device including at least one processor configured to execute computer-readable instructions included in a memory. The chatroom cover display method may include, by the at least one processor, receiving a message thread including messages exchanged through a chatroom in response to an access request for the chatroom, and displaying a cover screen of the chatroom in response to the access request and displaying the message thread on the cover screen.

The receiving may include determining whether a user has joined the chatroom, and receiving the message thread when the user has not joined the chatroom.

The receiving may include receiving the message thread when the chatroom is an openchat chatroom to which an access is requested using a link.

The receiving may include receiving the message thread when a cover message display function of the chatroom is activated by an administrator setting.

The receiving may include receiving at least one of a first message thread that is selected based on a message send time and a second message thread that is selected based on a topic through a conversation pattern analysis.

The receiving may include receiving the message thread that includes messages selected based on at least one of a message length and a message type.

The displaying may include displaying the message thread based on a message send time.

The displaying may include displaying the messages included in the message thread in an inactive mode in which a preview is allowed and a selection is disallowed.

The displaying may include selectively displaying the first message thread and the second message thread through individual taps on the cover screen when the first message thread and the second message thread are received.

The displaying may include simultaneously displaying the first message thread and the second message thread on the cover screen and distinguishably displaying the first message thread and the second message thread by separating an area on the cover screen or by using a display element of a message user interface or a separate identifier, when the first message thread and the second message thread are received.

According to an aspect of at least one example embodiment, there is provided a non-transitory computer-readable record medium storing instructions that, when executed by a processor, cause a computer device to perform the chatroom cover display method.

According to an aspect of at least one example embodiment, there is provided a computer device including at least one processor configured to execute computer-readable instructions included in a memory. The at least one processor may be configured to receive a message thread including messages exchanged through a chatroom in response to an access request for the chatroom, and display a cover screen of the chatroom in response to the access request and to display the message thread on the cover screen.

Further areas of applicability will become apparent from the description provided herein. The description and specific examples in this summary are intended for purposes of illustration only and are not intended to limit the scope of the present disclosure.

DETAILED DESCRIPTION

Figure 1:
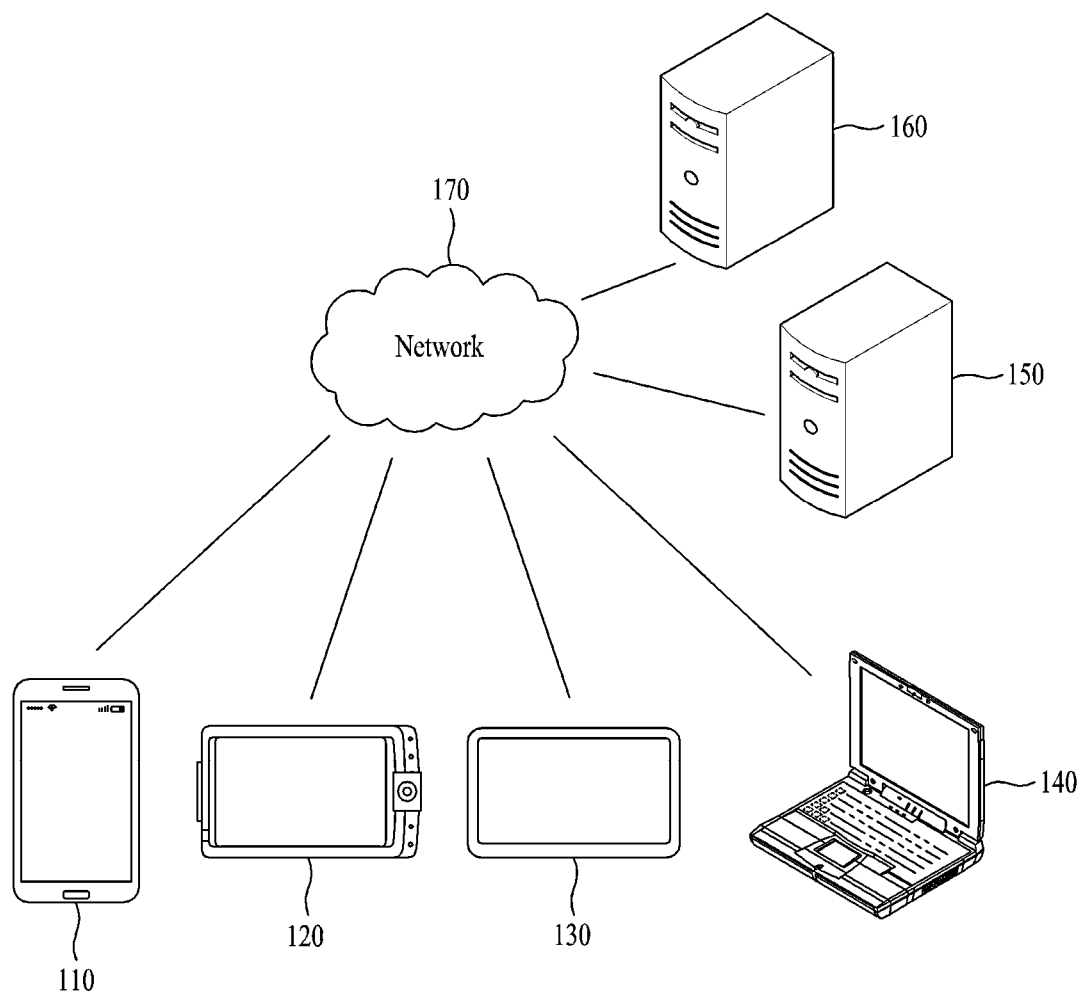
FIG. 1 is a diagram illustrating an example of a network environment according to at least one example embodiment.

One or more example embodiments will be described in detail with reference to the accompanying drawings.

Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing a chatroom cover screen.

The example embodiments included in this disclosure may display a message thread with high up-to-dateness and a message thread with high information (e.g., a message thread including messages meeting a predetermined (or alternatively, desired) condition on a chatroom cover screen as a function that assists a user to easily grasp information, context, atmosphere, and the like in a chatroom before joining the chatroom.

The chatroom used herein may encompass a community space on the Internet, for example, a messenger and a social network service (SNS). In some example embodiments, the chatroom may refer to a community space that allows a user to participate in a conversation on the premise of joining, for example, an openchat that allows an immediate chat using a link (e.g., a uniform resource locator (URL)) without a friend addition process using a telephone number and/or an ID, a chatroom with an official account that represents an account in a form of a bot providing various types of services or contents.

Also, the chatroom cover screen may refer to a cover screen on which information (e.g., a chatroom name, a profile image, a chatroom description, and/or a number of members joining a corresponding chatroom) about the chatroom is displayed before entering the chatroom.

A chatroom cover display system according to some example embodiments may be implemented by at least one computer device. A chatroom cover display method according to some example embodiments may be performed by at least one computer device included in the chatroom cover display system. Here, a computer program according to an example embodiment may be installed and run on the computer device and the computer device may perform the chatroom cover display method according to some example embodiments under control of the computer program. The aforementioned computer program may be stored in a computer-readable record medium to implement the chatroom cover display method in conjunction with the computer device.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to some example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a messenger service, to the plurality of electronic devices 110, 120, 130, and 140 connected over the network 170.

Figure 2:
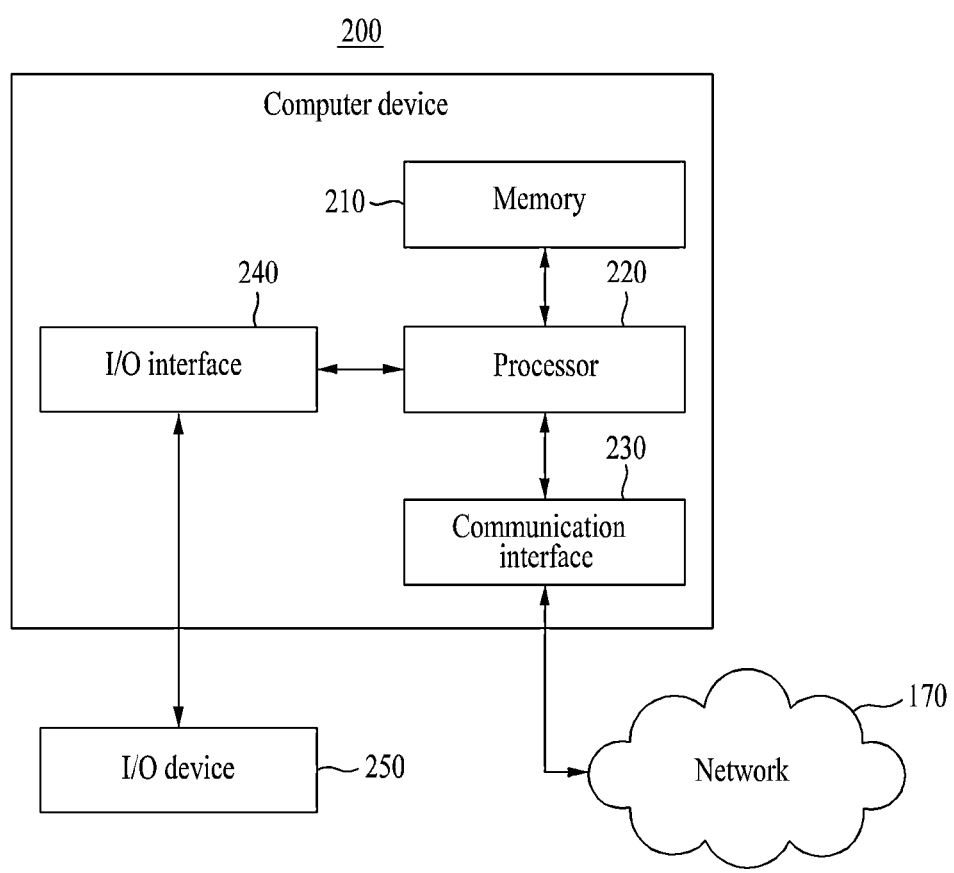
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable record medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The communication interface 230 may provide a function for communication between the communication apparatus 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. At least one of the I/O apparatus 250 may be configured as a single apparatus with the computer device 200. For example, a touchscreen, a microphone, a speaker, etc. of a smartphone may be included in the computer device 100.

Also, according to other example embodiments, the computer device 200 may include a greater or smaller number of components than the number of components of FIG. 2. However, there is no need to clearly illustrate most conventional components. For example, the computer device 200 may be configured to include at least a portion of the I/O apparatus 250 or may further include other components, such as a transceiver and a database.

Hereinafter, methods and systems for displaying a message thread on a chatroom cover screen according to some example embodiments will be described.

Hereinafter, an example of an openchat that is one type of chatroom is described.

Figure 3:
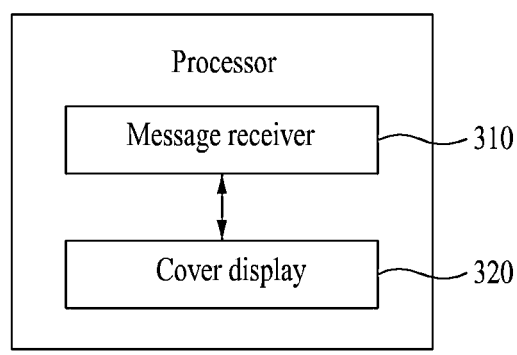
FIG. 3 illustrates an example of a component includable in a processor of a computer device according to at least one example embodiment.
Figure 4:
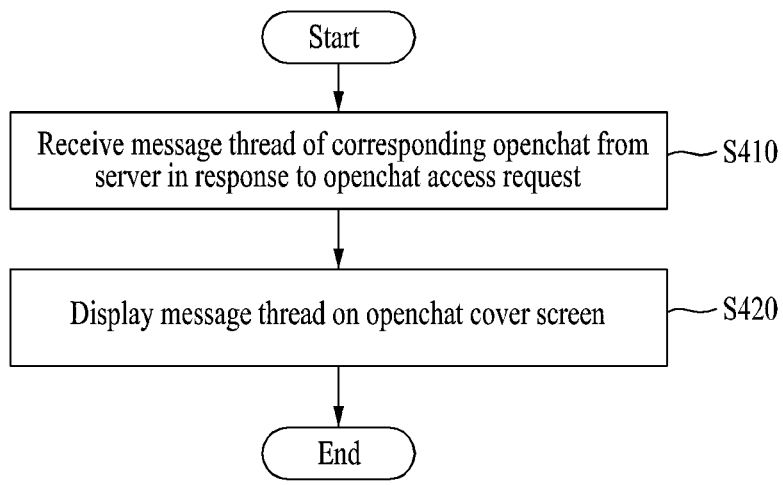
FIG. 4 is a flowchart illustrating an example of a method performed by a computer device according to at least one example embodiment.

FIG. 3 is a diagram illustrating an example of a component included in a processor of a computer device according to at least one example embodiment, and FIG. 4 is a flowchart illustrating an example of a chatroom cover display method performed by a computer device according to at least one example embodiment.

The computer device 200 according to the example embodiment may provide a messenger service through connection to an exclusive application or a website/mobile site. A chatroom cover display system implemented as a computer may be configured in the computer device 200. For example, the chatroom cover display system may be implemented in a form of a program that independently operates or may be configured in an in-app for of a specific application to be operable on the specific application.

Referring to FIG. 3, the processor 220 of the computer device 200 may include a message receiver 310 and a cover display 320 as components to perform the following chatroom cover display method. Depending on some example embodiments, one or more components of the processor 220 may be selectively included in or excluded from the processor 220. Also, depending on some example embodiments, one or more components of the processor 220 may be separated or merged for functional representation of the processor 220.

The processor 220 and the components of the processor 220 may control the computer device 200 to perform operations included in the following chatroom cover display method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200. For example, the message receiver 310 may be used as a functional representation of the processor 220 that controls the computer device 200 to receive a message thread in response to the instruction.

The processor 220 may read an instruction from which instructions related to control of the computer device 200 are loaded. In this case, the read instruction may include an instruction for controlling the processor 220 to perform the following chatroom cover display method.

Operations included in the following chatroom cover display method may be performed in order different from order illustrated below. A portion of the operations may be omitted or an additional process may be further included.

Operations included in the chatroom cover display method may be performed by a client on which a messenger is installed. Depending on some example embodiments, a portion of operations may be performed by the server 150.

Referring to FIG. 4, in operation S410, when receiving an openchat access request using a link, the message receiver 310 may receive a message thread of an openchat corresponding to the corresponding link from the server 150 in response to the openchat access request. When the openchat access request is received, the message receiver 310 may determine whether the user has joined the corresponding openchat. When the user has not joined the openchat, the message request 310 may request the server 150 for the message thread. Here, the message thread may be associated with information and context of the openchat as a message to be displayed as a cover. Not only a text but also any type of messages exchangeable through a chatroom, for example, an image, a video, an audio, and a file, may be included in the message thread.

The server 150 may verify an option status, which refers to on/off status of an option indicating a cover message display function, by an administrator setting of the openchat. Therefore, the server 150 may provide the message thread only to an openchat in which the cover message display function is turned ON (activation). The server 150 may distribute a message created after a point in time at which the cover message display function is set to be in an "ON" state for the openchat, as a message that may be exposed (e.g., as a message desired to be displayed on an openchat cover). When the cover message display function is repeatedly turned ON or OFF and finally changed to be in an "ON" state, a previous message may not be included in a distribution target and only a message created after a final "ON" state may be included in the distribution target.

In the case of an openchat of which a cover message display function is changed from an "ON" state to an "OFF" state, all messages that have been distributed may not be changed to be in-distributable. The server 150 may not provide a message thread in an openchat of which a cover message display function is set to be OFF and in an openchat of which a cover message display function is set to be ON but meets a predetermined (or alternatively, desired) exclusion condition. For example, the server 150 may not provide a message thread in an openchat created or modified in less than a predetermined (or alternatively, desired) period of time (e.g., 45 minutes), in an openchat already deleted, in an openchat deactivated, and in an openchat excluded from a display target based on score according to an operation inspection, and in an openchat included in a disciplinary action.

For an openchat of which a cover message display function is set to be ON, the server 150 may provide at least a portion of messages corresponding to a distribution target as a message to be displayed as a cover.

For example, the server 150 may collect and provide a message thread with high up-to-dateness among messages exchanged through an openchat chatroom according to a client request. By providing a more real-time recent message thread, a user may grasp the recent context of a corresponding chatroom in advance before joining the chatroom. The server 150 may provide a message of which a message send time elapses for a predetermined (or alternatively, desired) period of time (e.g., 10 minutes) among messages included in the openchat chatroom, thereby enhancing a real-time property while blocking or preventing an inappropriate message from being displayed accordingly. The predetermined (or alternatively, desired) period of time may be determined based on an amount of time used for message inspection (e.g., an amount of time for identifying and filtering out abusing messages). The server 150 may provide messages stored in a storage space of the server 150 (e.g., messages within a storage period guaranteed by the server 150) as messages of the openchat chatroom such that the user may grasp as many contexts as possible. A server storage period (e.g., a message storage expiration time) may differ depending on a message type. For example, the server 150 may store a text for 180 days, may store an image for 30 days, may store a video and an audio for 14 days, and may store a file for 7 days.

As another example, the server 150 may archive and provide a message thread with high information (e.g., a message thread including messages meeting a predetermined (or alternatively, desired) condition) among messages exchanged through an openchat chatroom according to a client request. The server 150 may archive a message based on meaningful content by analyzing a conversation pattern through messages as well as reactions of users that participate in an openchat. To this end, the server 150 may extract a conversation topic that varies in real time within the openchat and may provide a message related to the corresponding topic as a message to be displayed as a cover. The server 150 may extract at least one word popularly used in a corresponding chatroom at an interval of a unit time (e.g., 1 day) and may determine a word that exceeds a predetermined (or, alternatively, desired) level as a topic with high topicality using a topic probability distribution for each message included in the chatroom. The server 150 may select a message that meets a predetermined (or alternatively, desired) condition based on a text length, a message type, etc., as a message that is highly likely to be a useful message in terms of information. For example, the server 150 may select a message that includes at least five words, a message that has received a positive reaction, and a message that includes a keyword identical or similar to a topic and may provide the selected message as a message to be displayed as a cover. Such a selected message is referred to as a high-information message and may be managed through a separate archive table without restriction on a storage expiration period.

Also, when collecting a message thread, the server 150 may exclude a message corresponding to a predetermined (or, alternatively, desired) meaningless conversation pattern, for example, an image-type sticker, a character emoticon (e.g., 'kkk,' 'hh,' and 'TT'), a text message of less than a predetermined (or alternatively, desired) length, a message with a mention, a URL, and a message registered as an announcement or an advertisement. Also, the server 150 may exclude a deleted message, for example, a message deleted by an openchat member, a message deleted by an openchat administrator, and a message deleted in a form of a disciplinary action through a message inspection.

When a number of messages collected as a message to be displayed as a cover in a process of collecting a message thread is less than a predetermined (or alternatively, desired) minimum number, the server 150 may adjust message selection criteria. For example, the server 150 may select a message that includes at least five words as a message to be displayed as a cover, and if a number of selected messages is insufficient, may additionally select a message that includes at least three words. In some example embodiments, when a number of messages selected as a message to be displayed as a cover is insufficient, the server 150 may include an image sticker or a character emoticon corresponding to an exclusion target.

Therefore, the message receiver 310 may collect a high-up-to-date message thread (hereinafter, also referred to as a recent message) and/or a high-information message thread (hereinafter, also referred to as an archive message or a message thread with high information) among messages exchanged through a corresponding openchat according to an openchat access request through interaction with the server 150.

Depending on some example embodiments, as an option of a cover message display function for an openchat, at least one display target among the recent message and the archive message may be set by an administrator and the server 150 may provide at least one of the recent message and the archive message based on an administrator setting value of the corresponding openchat in response to an openchat access request.

In operation 5420, the cover display 320 may display a cover screen of the corresponding openchat in response to the openchat access request using a link, and may display the message thread received in operation 5410 on the openchat cover screen. The cover display 320 may determine whether the user has joined openchat that the user has requested an access to. When the user has not joined the corresponding openchat, the cover display 320 may display the message thread on the corresponding openchat cover screen. Here, when the user has joined the corresponding openchat, the cover display 320 may omit displaying of the message thread. For example, the cover display 320 may display a message to be overlaid on the openchat cover screen, and may consecutively display a plurality of messages of the corresponding openchat according to scrolling in a predetermined (or, alternatively, desired) direction (e.g., scrolling up/down). The cover display 320 may display each of messages included in the message thread through an individual message user interface (UI) (e.g., a speech bubble) in the same manner as a message displayed in the openchat chatroom. The cover display 320 may sequentially display messages included in the message thread based on a message send time. For example, the cover display 320 may display the message thread in oldest order (e.g., display a first sent message on a top) such that the user may read a message and easily grasp the overall context. In some example embodiments, the cover display 320 may display a message in recent order based on a message send time in the case of the recent message in the message thread or may display a message determined to be useful through an analysis logic in the case of the archive message. That is, archive messages may be displayed in order of high user reaction or high meaning (e.g., high topicality).

The message thread may be displayed on the openchat cover screen in the same manner as a method of displaying the message thread in the openchat chatroom. In some example embodiments, the message thread may be displayed in a preview form on the openchat cover screen and may be displayed in an inactive mode in which a selection is disallowed.

When displaying the message thread on the openchat cover screen, the cover display 320 may display a message send time for each message in the same manner as a method of displaying the message thread in the openchat chatroom. Depending on some example embodiments, in addition to a method of directly displaying the message send time, it is possible to apply the message send time to a message display interval. For example, the cover display 320 may display speech bubbles to be spaced apart in proportion to a difference in message send times between a previous message and a subsequent message.

In the case of receiving the recent message and the archive message as the message thread according to the openchat access request, the cover display 320 may display the recent message and the archive message on the openchat cover screen. For example, the cover display 320 may separate and selectively display the recent message and the archive message with a tap on the openchat. The user may selectively verify a message through an individual tap on the openchat cover screen. In some example embodiments, the cover display 320 may display a recent message tap by default and may display an archive message tap depending on a user selection, or vice versa. As another example, the cover display 320 may simultaneously display the recent message and the archive message on the openchat cover screen. In the case of simultaneously displaying the recent message and the archive message, the cover display 320 may distinguish and thereby display the recent message and the archive message by dividing an area on the openchat cover screen or by using a display element (e.g., a speech bubble color, a text color, etc.) of a message UI or a separate identifier.

FIGS. 5 to 10 illustrate examples of an openchat cover display process according to some example embodiments.

FIGS. 5 to 10 illustrate examples of an interface screen of a messenger running on a client device that is an electronic device of a user.

Figure 5:
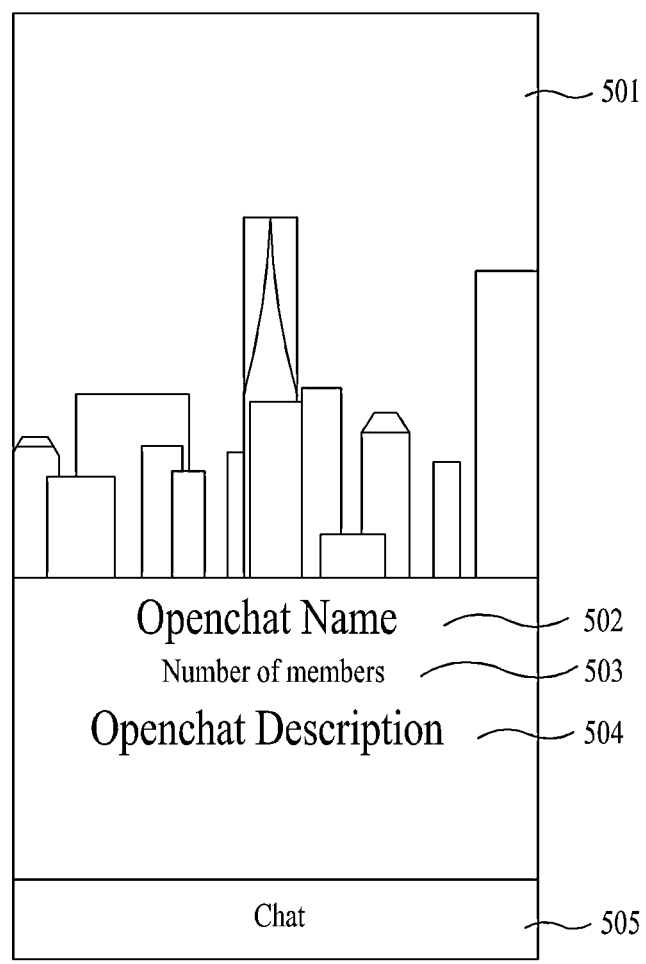
FIGS. 5 to 10 illustrate examples of an openchat cover display process according to some example embodiments.

FIG. 5 illustrates an example of an openchat cover screen 500 accessed with joining as a member, and FIGS. 6 to 10 illustrate examples of an openchat cover screen 600 accessed without joining as a member.

An openchat/openchat chatroom refers to a chatroom that allows participation in a conversation on the premise of joining. When accessing the openchat, a conversation of the corresponding chatroom may not be immediately displayed and a cover screen that is an openchat cover may be initially displayed. A joined member may enter the chatroom through an openchat cover screen 500 and an unjoined member may access up to an openchat cover screen 600 and is disallowed to enter the chatroom.

Referring to FIG. 5, a profile image 501, a chatroom name 502, a number of joined members 503, a chatroom description 504, and the like may be displayed on the openchat cover screen 500 as basic information about a corresponding openchat.

A chatroom entry menu 505 for entering the chatroom may be included in the openchat cover screen 500 in a joined state.

Because it is impossible or not allowed to enter the chatroom before joining as a member, it is difficult to grasp more detailed information or atmosphere only with the basic information displayed on the openchat cover screen 500.

Some example embodiments may display a recent message and/or an archive message on a chatroom cover screen as a function of providing information or context in a corresponding chatroom before joining as a member. In this manner, by providing the information or the context in the chatroom in a preview form, it is possible to reduce resource waste of the server 150 according to creation of an unused communication session.

Figure 6:
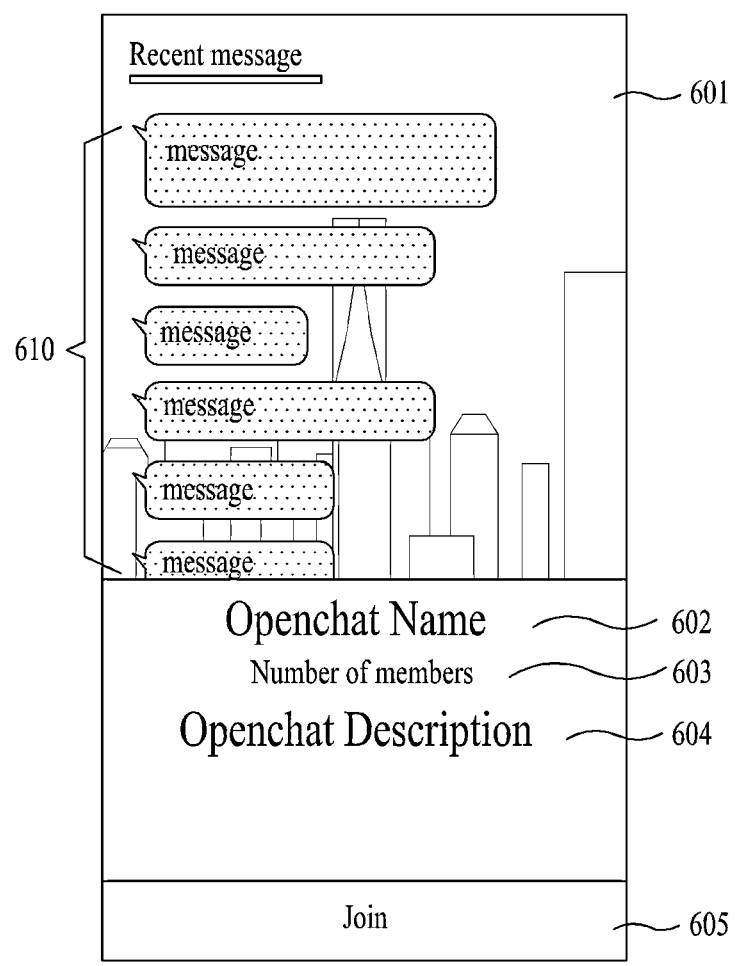

Referring to FIG. 6, when the user accesses an openchat but has not joined the openchat, the processor 220 may display a message thread 610 including messages exchanged in the corresponding openchat on the openchat cover screen 600 through a cover message display function.

The processor 220 may display the message thread 610 to be overlaid on the openchat cover screen 600 on which basic information, for example, a profile image 601, a chatroom name 602, a number of joined members 603, and a chatroom description 604, is displayed.

The cover message display function is provided in a state in which the user has not joined the openchat. Here, a member join menu 605 for joining as an openchat member, instead of the chatroom entry menu 505, may be included in the openchat cover screen 600.

A user in an unjoined state may verify the message thread 610 through the openchat cover screen 600 and may recognize sufficient information and context through messages actually exchanged between members in the corresponding openchat in a stage before joining.

Referring to FIG. 6, when an openchat administrator selects only a recent message as a target to be displayed as a cover message, the processor 220 may display the message thread 610 that includes high-up-to-date messages on the openchat cover screen 600.

Figure 7:
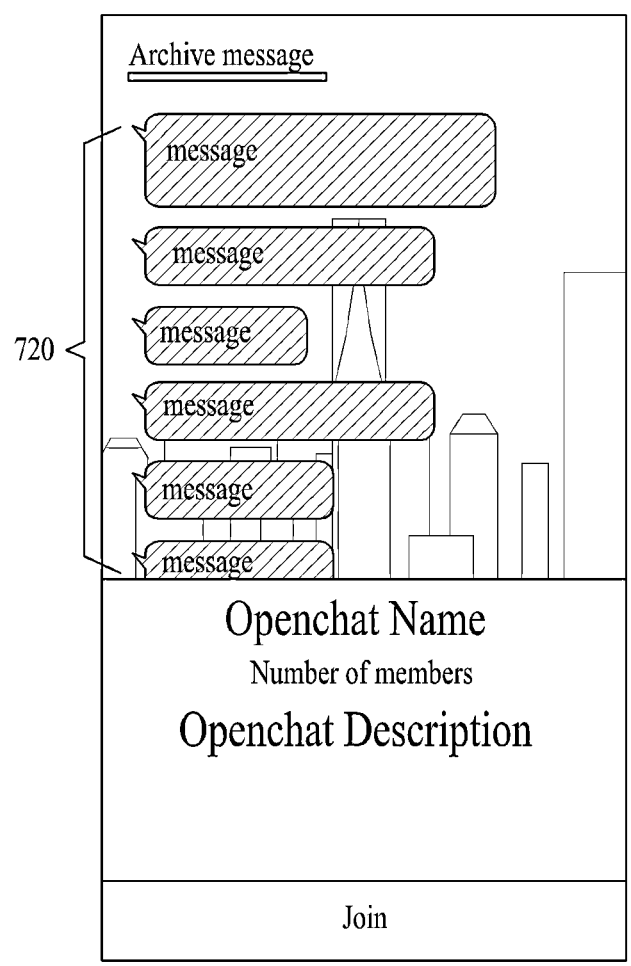

Meanwhile, referring to FIG. 7, when the openchat administrator selects only an archive message as a target to be displayed as a cover message, the processor 220 may display a message thread 720 that includes high-information messages (e.g., a high-information message thread 720) on the openchat cover screen 600.

On the other hand, when the openchat administrator selects all of the recent message and the archive message as a target to be displayed as a cover message, the processor 220 may display a message thread that includes high-up-to-date messages and a message thread that includes high-information messages on the openchat cover screen 600.

Figure 8:
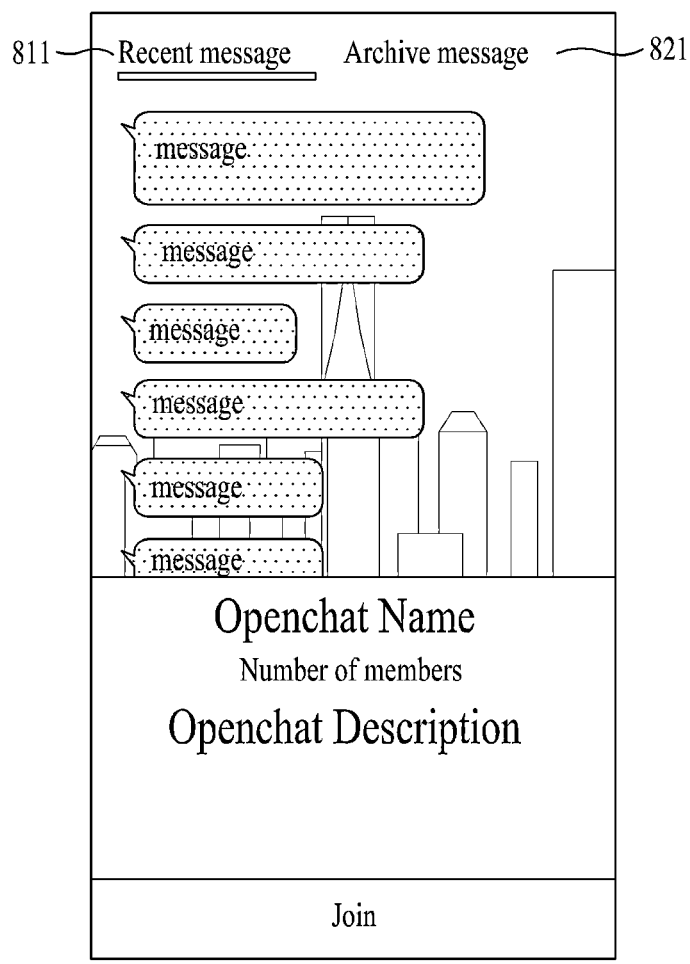

For example, referring to FIG. 8, a recent message tap 811 for displaying the recent message and an archive message tap 821 for displaying the archive message may be included in the openchat cover screen 600. A message thread of one of the recent message and the archive message may be selectively displayed through a tap selected by the user. Here, the processor 220 may display the recent message tap 811 by default and may display the archive message tap 821 depending on a user selection. The archive message tap 821 may be displayed by default.

Figure 9:
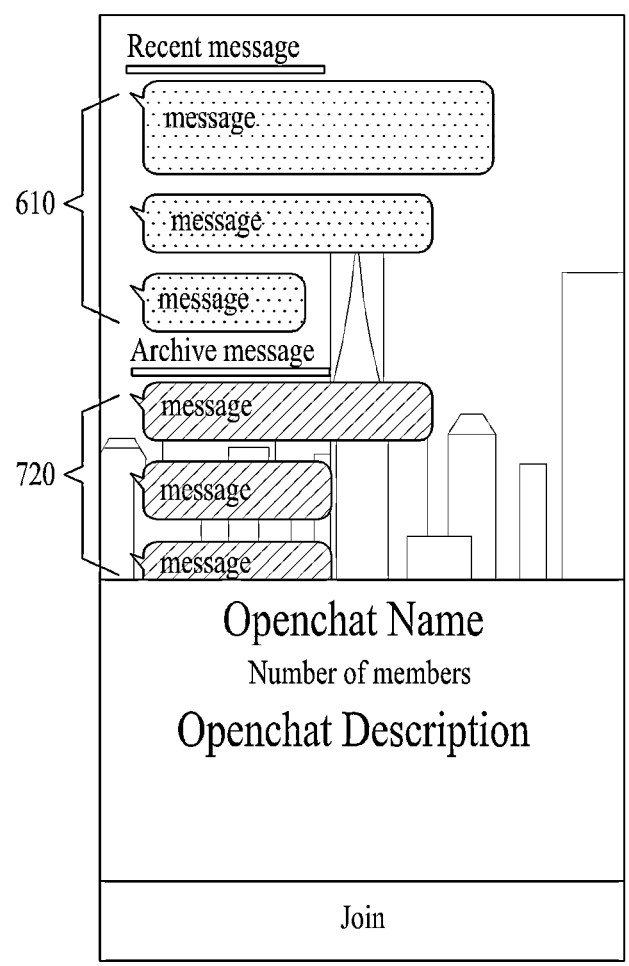

As another example, referring to FIG. 9, the processor 220 may simultaneously display the message thread 610 that includes the high-up-to-date messages and the message thread 720 that includes the high-information messages on the openchat cover screen 600. In the case of simultaneously displaying the recent message and the archive message, the processor 220 may display the message thread 610 corresponding the recent message and the message thread 720 corresponding to the archive message by dividing an area within the openchat cover screen 600 or by differently applying a display element (e.g., a speech bubble color and a text color) of a message UI.

Figure 10:
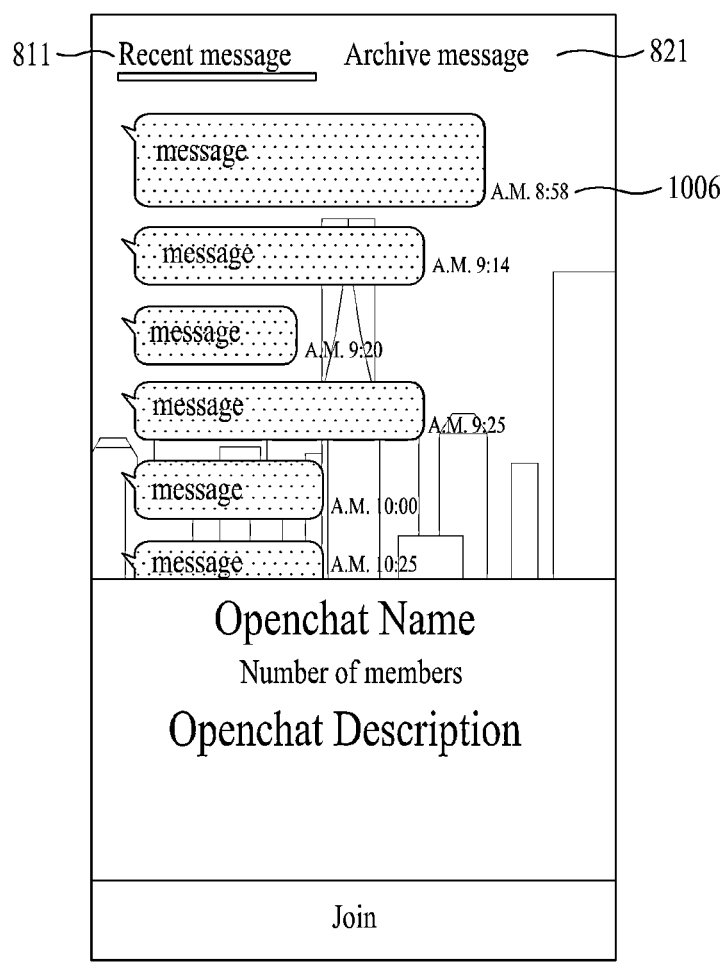

Referring to FIG. 10, when displaying the recent message tap 811 or the archive message tap 821 on the openchat cover screen 600, the processor 220 may display a message send time 1006 for each message in the same manner as a method of displaying a message in a chatroom.

A cover message display function according to some example embodiments enables a user to grasp information or context of a corresponding openchat before joining. Displaying of the message send time 1006 may be omitted on the openchat cover screen 600.

As described above, according to some example embodiments, a message thread with a high up-to-dateness and/or a message thread with high information among messages actually exchanged between members through a corresponding openchat may be displayed on a chatroom cover screen such that the user may easily grasp information, context, or atmosphere in an openchat chatroom before joining the corresponding openchat. By providing information or the context of the chatroom in a preview form instead of creating an unused communication session with the user who has not joined as a member yet, it is possible to reduce resource waste in a server providing a chatroom (e.g., an openchat chatroom) service.

The apparatuses described above may be implemented using hardware components, software components, and/or a combination thereof. For example, a processing device and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A chatroom cover display method performed by a computer device comprising at least one processor configured to execute computer-readable instructions included in a memory, the chatroom cover display method comprising:
   by the at least one processor,
   in response to an access request for a chatroom,
   excluding at least one meaningless message from messages exchanged through the chatroom based on a preset condition;
   collecting a message thread including a first set of messages among the messages without the meaningless message, wherein the first set of messages are collected based on a message selection criterion that a specific message has a length longer than a desired first length; and
   displaying a cover screen of the chatroom and displaying the collected message thread on the cover screen,
   wherein the collecting comprises
      in response to a determination that a number of the messages in the first set is less than a threshold, adjusting the message selection criterion by decreasing the desired first length into a desired second length such that at least one additional message is further collected based on the adjusted message selection criterion, each of the at least one additional message having has a length longer than the desired second length and not longer than the desired first length, and
      further collecting the additional message to be included in the message thread based on the adjusted message selection criterion.

2. The chatroom cover display method of claim 1, further comprising:
   in response to the access request,
   determining whether a user has joined the chatroom; and
   collecting the message thread when the user has not joined the chatroom.

3. The chatroom cover display method of claim 1, wherein the collecting comprises collecting the message thread when the chatroom is an openchat chatroom to which an access is requested using a link.

4. The chatroom cover display method of claim 1, wherein the collecting comprises collecting the message thread when a cover message display function of the chatroom is activated by an administrator setting.

5. The chatroom cover display method of claim 1, wherein the collecting comprises collecting at least one of a first message thread including at least one first message that is selected based on a message send time from the messages without the meaningless message and a second message thread including at least one second message that is selectively archived based on a topic through a conversation pattern analysis from the messages without the meaningless message.

6. The chatroom cover display method of claim 5, wherein the displaying comprises selectively displaying the first message included in the first message thread and the second message included in the second message thread through individual taps on the cover screen when the first message thread and the second message thread are received.

7. The chatroom cover display method of claim 5, wherein the displaying comprises simultaneously displaying the first message included in the first message thread and the second message included in the second message thread on the cover screen and distinguishably displaying the first message included in the first message thread and the second message included in the second message thread by separating an area on the cover screen or by using a display element of a message user interface or a separate identifier, when the first message thread and the second message thread are collected.

8. The chatroom cover display method of claim 1, wherein the displaying comprises displaying messages included in the message thread based on a message send time.

9. The chatroom cover display method of claim 1, wherein the displaying comprises displaying the messages included in the message thread in an inactive mode in which a preview is allowed and a selection of the messages included in the message thread is disallowed.

10. The chatroom cover display method of claim 1, wherein the excluding comprises excluding at least one of: i) a message including at least one of an image-type sticker or a character emoticon, ii) a message with a mention, iii) a message including a URL, or iv) a message including an advertisement, as the meaningless message from the messages.

11. A non-transitory computer-readable record medium storing instructions that, when executed by a processor, cause a computer device to perform the chatroom cover display method of claim 1.

12. A computer device comprising:
   at least one processor configured to execute computer-readable instructions included in a memory,
   wherein the at least one processor is configured to,
   in response to an access request for a chatroom,
   exclude at least one meaningless message from messages exchanged through the chatroom based on a preset condition,
   collect a message thread including a first set of messages among the messages without the meaningless message, wherein the first set of messages are collected based on a message selection criterion that a specific message has a length longer than a desired first length, and
   display a cover screen of the chatroom and display the collected message thread on the cover screen,
   wherein the at least one processor is configured to
   in response to a determination that a number of the messages in the first set is less than a threshold, adjust the message selection criterion by decreasing the desired first length into a desired second length such that at least one additional message is further collected based on the adjusted message selection criterion that has a length longer than the desired second length and not longer than the desired first length, and further collect the additional message to be included in the message thread based on the adjusted message selection criterion.

13. The computer device of claim 12, wherein the at least one processor is configured to determine whether a user has joined the chatroom and to collect the message thread when the user has not joined the chatroom.

14. The computer device of claim 12, wherein the at least one processor is configured to collect the message thread when the chatroom is an openchat chatroom to which an access is requested using a link.

15. The computer device of claim 12, wherein the at least one processor is configured to collect the message thread when a cover message display function of the chatroom is activated by an administrator setting.

16. The computer device of claim 12, wherein the at least one processor is configured to collect at least one of a first message thread including at least one first message that is selected based on a message send time from the messages without the meaningless message and a second message thread including at least one second message that is selectively archived based on a topic through a conversation pattern analysis from the messages without the meaningless message.

17. The computer device of claim 16, wherein the at least one processor is configured to selectively display the first message included in the first message thread and the second message included in the second message thread through individual taps on the cover screen when the first message thread and the second message thread are collected.

18. The computer device of claim 16, wherein the at least one processor is configured to simultaneously the first message included in display the first message thread and the second message included in the second message thread on the cover screen and to distinguishably display the first message included in the first message thread and the second message included in the second message thread by separating an area on the cover screen or by using a display element of a message user interface or a separate identifier, when the first message thread and the second message thread are collected.

19. The computer device of claim 12, wherein the at least one processor is configured to, display some of the messages included in the message thread based on a message send time, and display some of the messages included in the message thread in an inactive mode in which a preview is allowed and a selection of a specific message included in the message thread is disallowed.

\* \* \* \* \*